US009726369B2

(12) United States Patent
Gauthier et al.

(10) Patent No.: US 9,726,369 B2
(45) Date of Patent: Aug. 8, 2017

(54) CHEMICAL-LOOPING COMBUSTION METHOD WITH ASHES AND FINES REMOVAL IN THE REDUCTION ZONE AND PLANT USING SAME

(75) Inventors: Thierry Gauthier, Brignais (FR); Ali Hoteit, Paris (FR); Florent Guillou, Ternay (FR); Sébastien Rifflart, Paris (FR)

(73) Assignees: TOTAL SA, Courbevoie (FR); IFP ENERGIES NOUVELLES, Rueil-Malmaison (FR)

( * ) Notice: Subject to any disclaimer, the term of this patent is extended or adjusted under 35 U.S.C. 154(b) by 604 days.

(21) Appl. No.: 14/346,133

(22) PCT Filed: Aug. 9, 2012

(86) PCT No.: PCT/FR2012/000336
§ 371 (c)(1),
(2), (4) Date: May 22, 2014

(87) PCT Pub. No.: WO2013/041779
PCT Pub. Date: Mar. 28, 2013

(65) Prior Publication Data
US 2014/0295359 A1    Oct. 2, 2014

(30) Foreign Application Priority Data
Sep. 20, 2011 (FR) ..................... 11 02848

(51) Int. Cl.
*F23C 10/01* (2006.01)
*F23C 10/24* (2006.01)
(Continued)

(52) U.S. Cl.
CPC ............ *F23C 10/01* (2013.01); *B01J 8/1827* (2013.01); *B01J 8/26* (2013.01); *B01J 8/32* (2013.01);
(Continued)

(58) Field of Classification Search
CPC combination set(s) only.
See application file for complete search history.

(56) References Cited

U.S. PATENT DOCUMENTS 2,394,710 A * 2/1946 McAfee ................. B01J 8/1881
  208/118
3,729,551 A * 4/1973 Gorin .................. C01B 17/0404
  423/168
(Continued)

FOREIGN PATENT DOCUMENTS

CN    101113343 A    1/2008
CN    101261010 A    9/2008
(Continued)

OTHER PUBLICATIONS

Office Action of CN Appln. No. 201280045638.6 dated Jun. 16, 2015 with English translation.

*Primary Examiner* — Kaity Handal
(74) *Attorney, Agent, or Firm* — Fitch, Even, Tabin & Flannery, LLP (57) ABSTRACT

The invention relates to an improved method for chemical-looping combustion of a solid hydrocarbon-containing feed using a particular configuration of the reduction zone with: a first reaction zone R1 operating under dense fluidized bed conditions; a second reaction zone R2; a fast separation zone S3 for separation of the unburnt solid feed particles, of fly ashes and of the oxygen-carrying material particles within a mixture coming from zone R2; fumes dedusting S4; a particle stream division zone D7, part of the particles being directly recycled to first reaction zone R1, the other part being sent to an elutriation separation zone S5 in order to collect the ashes through a line 18 and to recycle the dense particles through a line 20 to first reaction zone R1.

(Continued)

The invention also relates to a chemical-looping combustion plant allowing said method to be implemented.

14 Claims, 3 Drawing Sheets

(51) Int. Cl.

| | |
|---|---|
| *C01B 3/32* | (2006.01) |
| *F23C 10/00* | (2006.01) |
| *F23C 10/10* | (2006.01) |
| *F23C 99/00* | (2006.01) |
| *B01J 8/18* | (2006.01) |
| *B01J 8/26* | (2006.01) |
| *B01J 8/32* | (2006.01) |
| *F23J 1/00* | (2006.01) |

(52) U.S. Cl.
CPC ............ *F23C 10/005* (2013.01); *F23C 10/10* (2013.01); *F23C 10/24* (2013.01); *F23C 99/00* (2013.01); *F23J 1/00* (2013.01); *B01J 2208/00513* (2013.01); *F23C 2900/99008* (2013.01); *Y02E 20/346* (2013.01)

(56) References Cited

U.S. PATENT DOCUMENTS

| | | | |
|---|---|---|---|
| 2007/0124997 A1* | 6/2007 | Liu .................... | B01J 8/0055 48/198.7 |
| 2008/0164443 A1* | 7/2008 | White .................. | B01J 23/002 252/373 |
| 2008/0193349 A1* | 8/2008 | Morin .................. | B01J 8/067 422/213 |
| 2009/0072538 A1* | 3/2009 | Morin .................. | F02C 3/28 290/52 |
| 2009/0123346 A1* | 5/2009 | Morin .................. | B01J 8/0055 422/142 |
| 2011/0048296 A1* | 3/2011 | Maghdissian ........... | C01B 3/344 110/345 |
| 2011/0300060 A1* | 12/2011 | Guillou ................ | C01B 13/08 423/579 |
| 2011/0303875 A1* | 12/2011 | Hoteit ................ | C01B 3/42 252/373 |
| 2012/0134904 A1* | 5/2012 | Sanchez-Molinero | B01D 53/38 423/219 |
| 2012/0167808 A1* | 7/2012 | Beal .................. | F23C 10/002 110/245 |

FOREIGN PATENT DOCUMENTS

| | | |
|---|---|---|
| CN | 101349423 A | 1/2009 |
| CN | 101672530 A | 3/2010 |
| CN | 201865710 U | 6/2011 |
| CN | 102183014 A | 9/2011 |
| EP | 0211483 A2 | 2/1987 |
| EP | 2273192 A1 | 1/2011 |
| FR | 2850156 A1 | 7/2004 |
| FR | 2936301 A1 | 3/2010 |
| FR | 2960940 A1 | 12/2011 |

* cited by examiner

CHEMICAL-LOOPING COMBUSTION METHOD WITH ASHES AND FINES REMOVAL IN THE REDUCTION ZONE AND PLANT USING SAME

FIELD OF THE INVENTION

The invention relates to the sphere of chemical-looping oxidation-reduction (redox) combustion of solid hydrocarbon-containing feeds in order to produce energy, syngas and/or hydrogen.

More particularly, the invention relates to the removal of ashes produced in the reduction reactor of the chemical-looping combustion plant.

Terminology

Chemical-Looping Combustion or CLC: In the text hereafter, what is referred to as a CLC (Chemical-Looping Combustion) is a loop redox process on active mass. It can be noted that, in general, the terms oxidation and reduction are used with regard to the oxidized or reduced state of the active mass respectively. In a chemical-looping combustion plant, the oxidation zone is where the redox mass is oxidized and the reduction zone is where the redox mass is reduced.

Devolatilization

During thermal treatment, the organic compounds lose volatiles, first water and carbon dioxide, liquid and then gaseous hydrocarbons, then carbon oxide and eventually hydrogen. This process is called devolatilization. The devolatilization temperature and the magnitude of the phenomenon depend on the initial organic compound. Thus, for coals of increasing rank, devolatilization occurs at increasingly high temperatures.

Fluidized Bed

In the rest of the description:
what is referred to as a dense fluidized bed is a fluidized bed wherein the gas fraction $\epsilon_g$ is below 0.9, preferably below 0.8,
what is referred to as a dilute fluidized bed is a fluidized bed wherein the volume fraction of metallic oxide particles is below 10 vol. %.

BACKGROUND OF THE INVENTION

The Ashes Issue

Chemical-looping combustion is performed using oxygen-carrying materials such as metallic oxides that yield their oxygen in a reduction zone (referred to as "fuel reactor") under suitable operating conditions. Once reduced, the material is carried to an oxidation zone (referred to as "air reactor") where it is reoxidized on contact with an oxidizing gas (such as air or water vapour for example).

More generally, a chemical-looping combustion process comprises one or more reaction zones wherein combustion of a fuel (a hydrocarbon-containing feed for example) is carried out by contact with an oxygen-carrying solid that is reoxidized afterwards in at least one oxidation zone by contact with air or water vapour prior to being sent back to the combustion (or reduction) zone(s). The reaction zones allowing chemical-looping combustion reactions to be conducted generally consist of fluidized beds or transported beds.

Chemical-looping combustion (CLC) of solid hydrocarbon feeds is a method allowing notably energy (vapour, electricity, etc.) to be produced by recovery of the heat released by the combustion reactions, while producing $CO_2$-rich fumes. It is therefore possible to consider $CO_2$ capture after condensation and compression of the fumes. It is also possible to consider the production of syngas, or even hydrogen, by controlling the combustion and by performing the required purifications downstream from the combustion process.

In the reaction mechanisms associated with chemical-looping combustion in the reduction zone, it is established that the solid fuel goes through a gasification stage, promoted by the presence of water vapour or of carbon dioxide and by the temperature, then that the gas produced by the gasification stage is oxidized on contact with the oxygen-carrying material. If the solid fuel contains volatiles, the latter devolatilize at least partly on contact with the hot oxygen-carrying material and they are then oxidized thereby. It is also possible, in cases where the oxygen-carrying material naturally releases the oxygen according to the operating conditions, to have direct oxidation of the solid fuel by the gaseous oxygen released by the material in the fuel reactor.

Chemical-looping combustion of solid feeds requires severe and compelling operating conditions to be able to conduct the combustion reactions. In order to favour gasification of the fuel, high temperatures generally ranging between 800° C. and 1100° C., preferably between 850° C. and 1000° C., are necessary. The time required for gasification decreases as a function of the temperature and it generally ranges between 30 seconds and 30 minutes. It can therefore be advantageous to perform partial gasification, to separate the non-gasified fuel residue from the effluents and to recycle it. It is thus possible to reach rates of conversion (through gasification) per pass ranging between 50% and 80% in a temperature range between 850° C. and 1000° C., with reaction times ranging between 1 minute and 10 minutes, typically between 3 minutes and 5 minutes. The gasification times can be reduced by increasing the partial oxidizing gas ($H_2O$, $CO_2$) pressure.

Another problem linked with chemical-looping combustion of solid feeds relates to the formation of ashes. Indeed, solid fuels have not insignificant mineral material contents and, once combustion of the carbon and of the hydrogen is completed, solid residues called ashes form. Table 1 groups the analyses of two coals A and B by way of example. It can be observed that the ash content of the coals varies according to the origin of the solid feed, but this content is not insignificant. It typically represents 5 to 20% of the mass of dry coal. Some solid fuels such as pet coke have much lower ash contents. There are also solid fuels with higher ash contents.

These ashes essentially consist of silicon and aluminium oxide, but they also contain other components, as illustrated by way of example in Table 1.

TABLE 1

Analysis of the various coals

| | | | Coal A | Coal B |
|---|---|---|---|---|
| Dry coal analysis | Ashes | wt. % | 10.3 | 14.8 |
| | Volatiles | wt. % | 37.6 | 24 |
| | Sulfur | wt. % | 0.5 | 0.57 |
| | Specific heat | Kcal/kg | 6710 | 6630 |
| Ultimate analysis | C | wt. % | 71.1 | 73.46 |
| | H | wt. % | 4.77 | 3.87 |
| | N | wt. % | 1.41 | 1.65 |
| | S | wt. % | 0.5 | 0.57 |
| | Ashes | wt. % | 10.3 | 14.76 |
| | O (by difference) | wt. % | 11.92 | 5.69 |
| Ashes composition | SiO2 | wt. % | 67 | 49.84 |
| | Al2O3 | wt. % | 19.2 | 40.78 |

TABLE 1-continued

Analysis of the various coals

|  | — | Coal A | Coal B |
|---|---|---|---|
| Fe2O3 | wt. % | 5.2 | 2.9 |
| CaO | wt. % | 2 | 1.08 |
| MgO | wt. % | 1.2 | 0.26 |
| TiO2 | wt. % | 0.9 | 1.96 |
| K2O | wt. % | 1.7 | 0.64 |
| Na2O | wt. % | 1.7 | 0.06 |
| SO3 | wt. % | 0.9 | 0.52 |
| P2O5 | wt. % | 0.2 | 1.05 |

The ashes resulting from the combustion of the coal are made up of residual fine particles. Their melting point varies according to their composition and it generally ranges between 1000° C. and 1500° C. However, at lower temperatures, for example between 800° C. and 1000° C., it is possible to observe a phenomenon of agglomeration of the ash particles that become sticky. They can therefore either agglomerate with one another, or they agglomerate with the particles of oxygen-carrying material. Considering the operating conditions in the chemical-looping combustion process, two types of ashes can be distinguished:

fly ashes: they correspond to the ashes that are carried in the fuel reactor by the combustion gases, agglomerated ashes: they correspond to the ashes that agglomerate with one another or with the oxygen-carrying material and that are too heavy to be carried in the fuel reactor by the combustion gases.

Figure 3:
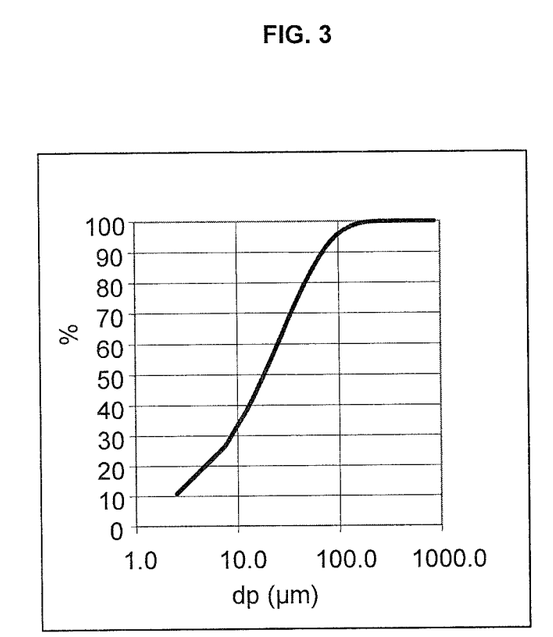
FIG. 3 shows an example of grain size distribution representative of the fly ashes, wherein the cumulative percentage by weight is represented as a function of the particle diameter (dp in microns).

Fly ashes generally represent 50% to 99% of the ashes formed, typically 70% to 90%. Their grain size is relatively fine with generally at least 25% fines with sizes below 10 microns and 90% fines with sizes below 100 microns, as illustrated in FIG. 3 where the typical grain size distribution of fly ashes is given by way of example. The Sauter mean diameter representative of the fly ash grain size generally ranges between 5 and 30 microns, and it is typically close to 10 microns. The grain density of these ashes generally ranges between 2000 and 3000 kg/m$^3$, and it is generally close to 2500 kg/m$^3$.

The grain size of the agglomerated ashes is more delicate to estimate and depends on the conditions of implementation of the method. In general terms, the grain size of these ashes is estimated to be above 100 microns and their size can reach several millimeters.

Patent application FR-2,850,156 describes a chemical-looping combustion method wherein the fuel is crushed prior to being fed to the circulating fluidized-bed reduction reactor. The reduced size of the solid fuel particles allows more complete and faster combustion, and it allows to produce nearly 100% fly ashes that are separated from the circulating oxides. Separation downstream from the circulating bed is first provided by a cyclone, then by a device allowing separation of the unburnt particles from the metallic oxide particles. Entrainment of unburnt particles in the oxidation zone and therefore $CO_2$ emissions in the oxidation reactor effluents is thus avoided.

The separation device comprises a bed fluidized by water vapour, which allows to separate the fine and lighter particles such as the carbon residue and to feed the latter back into the reactor, whereas the denser and thicker oxide particles are transferred to the oxidation reactor. This device contains two internal compartments.

Furthermore, according to document FR-2,850,156, the fly ashes are separated from the oxide particles in a second circuit where a fluidized-bed separator performs the separation, the fluidized fly ashes being sent to a silo via a pneumatic conveying system and the metallic oxides being extracted from the base of the fluidized-bed reactor after decanting.

Besides, the high gas rates operated in the circulating fluidized-bed reduction reactor do not allow to obtain sufficient particle residence times for gasifying all of the solid fuel, then for carrying out combustion of the gasification products. Extensive recycling of the unburnt particles by passage through the separator is therefore necessary. Now, separation of the unburnt particles from the oxide particles is delicate because it requires additional gas supply in large amounts, which is energy consuming.

Moreover, due to too short a residence time, it is difficult to carry out total combustion and the fumes contain large amounts of CO and $H_2$, which involves the presence of a post-combustion zone downstream from the process.

N. Berguerand's thesis "Design and Operation of a 10 kWth Chemical-Looping Combustor for Solid Fuels", ISBN 978-91-7385-329-3, describes a device allowing coal combustion to be conducted using a chemical loop.

This device consists of an oxidation reactor using metallic particles, a cyclone allowing separation of the particles and of the depleted air after oxidation, a fluidized bed supplied with oxidized metallic oxides through the return leg arranged below the cyclone, wherein reduction of the metallic oxide is carried out by combustion of the coal. The coal is fed into the upper part of the fluidized bed, in the dilute phase. In the reduction reactor, combustion of the coal takes place progressively: the coal particles first descend and devolatilize in the dilute phase, countercurrent to the fluidization gases, wherein the metallic oxides are present in small amounts only; then they come into contact with the fluidized metallic oxides in the dense phase. The long residence time allows to gasify the coal and to produce combustion gases containing large amounts of carbon monoxide and of hydrogen that pass into the dilute phase.

In the dense phase of the reactor, the fluidization rates are low—generally ranging between 5 and 30 cm/s—, which does not allow significant amounts of metallic oxides to be entrained in the dilute phase that might promote the combustion of gases such as CO, $H_2$ or the volatilized hydrocarbons that are discharged from the dilute zone. The amounts of CO and of hydrocarbons (HC) in the reduction reactor effluents are therefore significant and above several percents by volume. The combustion yield is thus not very good and a post-combustion zone is also necessary to complete the combustion.

Furthermore, according to this document, the reduction reactor is equipped with a particle separator integrated in the dense phase, which requires additional gas for the separation.

In this system, no specific device allowing separation and discharge of the ashes formed during combustion of the solid feeds is provided.

In order to overcome the drawbacks of the two systems described above, the applicants have developed an improved chemical-looping combustion method allowing, even from coarse fuel particles, to obtain total combustion of the solid feed while minimizing the amount of solid feed to be recycled, which allows to maximize the energy efficiency of the method. The combustion method according to the invention allows to capture at least 90% of the $CO_2$ emitted by the combustion in the fumes directly at the combustion reactor outlet, the capture rate being defined by the ratio of the amount of $CO_2$ emitted in the fumes coming from the combustion reactor to the amount of $CO_2$ emitted in the chemical-looping combustion process.

At the combustion process outlet, the $CO/CO_2$ molar ratio of the fumes downstream from the cyclones is below 0.05 and the $H_2/H_2O$ ratio is below 0.05. This is achieved, on the one hand, through optimization of the initial contact between the oxygen-carrying particles and the solid fuel so as to promote the coal gasification reactions and, on the other hand, through optimization of the contact between the gasification products and the metallic oxides so as to produce effluents that have undergone total combustion ($H_2$, CO and HC <1 vol. % in the fumes).

Besides, separation of the unburnt fuel particles from the metallic oxide particles is carried out upstream from the reduction reactor fumes dedusting stage so as to best use the maximum kinetic energy of the fumes for separation of the two types of particles.

The chemical-looping method comprises:
contacting of the solid feed particles in the presence of metallic oxide particles in a first reaction zone R1 operating under dense fluidized bed conditions,
combustion of the gaseous effluents from the first reaction zone in the presence of metallic oxide particles in a second reaction zone R2,
separation, within a mixture from this zone, of the gas, the unburnt particles and the metallic oxide particles in a separation zone S3,
reoxidation of the metallic oxide particles in an oxidation zone prior to sending them back to contacting zone R1.

Downstream from the unburnt particles and metallic oxide particles separation zone, a dedusting system comprising for example one or more cyclone stages can be provided for separation of the particles carried along in the fumes of the combustion zone of the fuel reactor. The fly ashes are carried along in the fumes to this dedusting system with the unburnt solid fuel particles. In order to maximize the energy efficiency of the plant, it is necessary to recover the main part of the unburnt fuel particles and thus to carry out deep dedusting. This dedusting will then allow to recover the unburnt particles, as well as a large part of the fly ashes that are then recycled to the fuel reactor.

It is possible to position an enclosure comprising a fluidized bed on the line channelling the particles separated during the dedusting stage so as to eliminate the fly ashes through elutriation. However, this means does not allow to control elutriation of the ashes and elutriation of the unburnt particles separately. In fact, in this case, good elimination of the ashes produced is consecutively translated into a significant elimination of the unburnt particles and therefore a decrease in the energy efficiency or a decrease in the $CO_2$ capture rate.

Furthermore, in cases where particles of the oxygen-carrying material are carried to the dedusting zone, it is necessary to dimension a large-size fluidized bed so as to allow sufficient time for elutriation separation in the fluidized bed.

In order to also overcome the drawbacks linked with the simultaneous removal of the unburnt particles and of the ashes, a new configuration is provided for the combustion zone (reduction zone or "fuel reactor"), which allows to perform:
contacting of the solid feed particles in the presence of metallic oxide particles in a first reaction zone R1 operating under dense fluidized bed conditions,
combustion in the dilute phase of the gaseous effluents from the first reaction zone in the presence of metallic oxide particles in a second reaction zone R2 preferably operating under dilute fluidized bed conditions,
separation of the particles within a mixture from dilute phase combustion zone R2 allowing to recover with the fumes the major part of the unburnt particles, in a separation zone S3,
dedusting of the fumes coming from separation zone S3 in a fumes dedusting zone S4,
division of the stream of particles separated in the dedusting stage into two streams, one recycled to the contacting zone of the dense phase reduction reactor, the other sent to an elutriation separation zone S5 allowing the ashes to be collected, in a stream division zone D7.

DESCRIPTION OF THE INVENTION

Objects of the Invention

The invention relates to an improved method for chemical-looping combustion of a solid hydrocarbon-containing feedstock using a particular configuration of the reduction zone with: a first reaction zone R1 operating under dense fluidized bed conditions; a second reaction zone R2; a fast separation zone S3 for separation of the unburnt solid feed particles, of fly ashes and of the oxygen-carrying material particles within a mixture coming from zone R2; fumes dedusting S4; a particle stream division zone D7, part of the particles being directly recycled to first reaction zone R1, the other being sent to an elutriation separation zone S5 in order to collect the ashes through a line 18 and to recycle the dense particles through a line 20 to first reaction zone R1

The invention also relates to a chemical-looping combustion plant allowing said method to be implemented.

SUMMARY OF THE INVENTION

The invention relates to a method for chemical-looping combustion of a solid hydrocarbon-containing feed wherein an oxygen-carrying material in form of particles circulates, said method comprising at least:
contacting of the solid feed particles with the oxygen-carrying material particles in a first reaction zone R1 operating under dense fluidized bed conditions,
combustion of the gaseous effluents from first reaction zone R1 in the presence of oxygen-carrying material particles in a second reaction zone R2,
separation of the unburnt solid feed particles, of fly ashes and of the oxygen-carrying material particles within a mixture coming from zone R2 in a fast separation zone S3 so as to carry along with combustion fumes (13) the major part of the unburnt solid feed particles and the fly ashes, and to send the major part of the oxygen-carrying material particles to an oxidation zone R0,
dedusting of fumes (13) from fast separation zone S3 in a fumes dedusting zone S4 so as to discharge a dedusted gas stream (14) and a stream (15) of particles containing ashes and dense particles predominantly consisting of oxygen-carrying material particles and unburnt solid feed particles,
division of stream (15) of particles separated in dedusting stage S4 into two streams in a stream division zone D7, one being recycled to first reaction zone R1 operating under dense fluidized bed conditions, the other being sent to an elutriation separation zone S5,
elutriation separation in said zone S5 so as to recover the ashes and to recycle the dense particles to first reaction zone R1.

In one embodiment, the method also comprises:
sedimentation of the furnace ashes agglomerated in the bottom of first reaction zone R1 in a fluidization zone S6 located beneath first reaction zone R1,
extraction of a particle stream (24) comprising at least 10 mass % of agglomerated furnace ashes.

Preferably, zone S6 is fluidized by a gas with a fluidization gas rate in the largest cross-section of flow of zone S6 that does not exceed 3 times the minimum rate of fluidization of the oxygen-carrying material.

Extraction of the agglomerated ashes in fluidization zone S6 is advantageously performed using a cooled screw.

The solid feed can be selected from among coal, coke, pet coke, biomass, bituminous sands and domestic waste.

Preferably, the oxygen-carrying material is a pulverulent solid whose particle size is such that 90% of the grain size distribution ranges between 150 and 300 microns.

The fluidization gas fed into elutriation separation zone S5 preferably consists at least partly of the fumes produced by the combustion of the solid feed.

More preferably, all of the fluidization gas fed into elutriation separation zone S5 preferably consists of the fumes produced by the combustion of the solid feed.

Advantageously, the stream directly recycled to first dense fluidized-bed reaction zone R1 represents at least 50% of the stream flowing into stream division zone D7. More advantageously, the stream directly recycled to first dense fluidized-bed reaction zone R1 represents at least 80% of the stream flowing into stream division zone D7.

The fly ash concentration in the particle mixture circulating in the combustion zone is preferably below 5 wt. %, more preferably below 1 wt. %.

The invention also relates to a plant for carrying out chemical-looping redox combustion of a solid hydrocarbon feed according to the method described above, said plant comprising at least:
a first reaction zone R1 comprising a solid feed supply line (10), a fluidization gas supply line (11) and a supply line (8) for the oxygen-carrying particles from oxidation zone R0,
a second reaction zone R2 receiving a gaseous combustion effluent containing particles from first reaction zone R1,
a fast solid particle separation zone S3 receiving a gaseous combustion effluent from second reaction zone R2 containing ashes, oxygen-carrying material particles and unburnt solid feed particles, and comprising a discharge line (9) for discharge of the major part of the oxygen-carrying material particles to oxidation zone R0,
a fumes dedusting zone S4 receiving through inlet (13) the lighter particles entrained by the combustion gases from fast separation zone S3,
a stream division zone D7 receiving through inlet (15) a stream of particles separated from the fumes in fumes dedusting zone S4, said stream comprising ashes and dense particles predominantly made up of oxygen-carrying material particles and unburnt solid feed particles,
an elutriation separation zone S5 receiving through inlet (17) a minor part of the particle stream divided in stream division zone D7, comprising a line (19) allowing supply of a fluidization gas and a line (18) allowing discharge of the lighter particles essentially containing fly ashes and oxygen-carrying material fines,
a line (16) coming from stream division zone D7 for recycling directly a major part of the particle stream divided in stream division zone D7 to first reaction zone R1,
a line (20) coming from elutriation separation zone S5 for recycling the dense particles separated by elutriation to first reaction zone R1.

The cross-section of flow of second reaction zone R2 is preferably smaller than the cross-section of flow of first reaction zone R1.

In an embodiment, the plant comprises a sedimentation zone for the agglomerated furnace ashes arranged beneath first reaction zone R1 and comprising:
an agglomerated ashes supply line (21),
a fluidization zone S6,
one or more lines (22) allowing a fluidization gas to be fed,
a discharge line (23) for recycling the oxygen-carrying material particles to first reaction zone R1,
means (24) for extraction of a particle stream containing at least 10 mass % of agglomerated furnace ashes.

Fluidization zone S6 is preferably a truncated zone with a half angle with respect to the vertical less than or equal to 15°.

DETAILED DESCRIPTION

The chemical-looping combustion method according to the invention comprises a reduction zone allowing:
contacting of the solid feed particles in the presence of metallic oxide particles in a first reaction zone operating under dense fluidized bed conditions,
combustion in the dilute phase of the gaseous effluents from the first reaction zone in the presence of oxygen-carrying material particles (metallic oxide particles for example) in a second reaction zone,
separation of the particles within a mixture from the dilute phase combustion zone, allowing to recover with the fumes the major part of the unburnt particles,
dedusting of the fumes coming from the separation zone,
division of the stream of particles separated in the dedusting stage into two streams, one recycled to the contacting zone of the dense phase fuel reactor, the other sent to an elutriation separation zone allowing the ashes to be collected.

The stream directly recycled to the first dense fluidized-bed reaction zone, without going through the separation stage, advantageously represents the major part of the stream recovered during the dedusting stage, i.e. at least 50%, preferably at least 80%. Under such conditions, a major part of the unburnt coal is recycled to the reduction reactor (fuel reactor). Part of the fly ashes is also recycled to the reduction reactor, but their concentration in the circulating particle stream remains limited. By optimizing the operation of the reduction zone, it is possible to obtain a fly ash concentration below 5% in relation to the oxygen-carrying material flow circulating in the reduction zone, and preferably below 1%.

The stream sent to the ashes elutriation separation zone advantageously represents a minor part of the stream recovered during the dedusting stage, i.e. less than 50%, preferably less than 20% of the stream leaving the reduction zone. The ashes separation zone consists for example of a fluidized bed whose fluidization rate is carefully selected so as to allow selective elimination of the fine particles, in particular the ashes with the fluidization gases. Inevitably, unburnt coal particles and the fine particles of oxygen-carrying material are entrained with the ashes from this separation zone. The heavier particles, i.e. the large unburnt coal particles and the major part of the oxygen-carrying material particles, remain in the fluidized bed and are recycled thereafter to the fuel reactor.

The operation of the plant is optimum when there is no ash accumulation in the fuel reactor. Under such conditions, the flow of separated ashes entrained with the fluidization gases in the elutriation separation zone corresponds to the flow of fly ashes generated by the chemical-looping coal combustion in the fuel reactor minus the flow of ashes discharged in the combustion fumes or in the effluents of the air reactor. By increasing the oxide circulation to the elutriator, the amount of ashes discharged is increased and the concentration of ashes circulating in the fuel reactor is limited. Risks of agglomeration between the ashes and the metallic oxide during the combustion are thus limited.

Furthermore, in cases where the oxygen-carrying particles undergo mechanical degradation (attrition) leading to the creation of fines, it is possible to adjust the operating conditions of the separation zone so as to not only eliminate the combustion fly ashes, but also the fine particles of oxygen-carrying material that have undergone attrition. Under these new conditions, the operation of the plant is optimum when the flow of separated ashes entrained with the fluidization gases in the separation zone corresponds at least to the flow of fly ashes generated by the chemical-looping coal combustion in the fuel reactor and to the flow of particles of oxygen-carrying material that have undergone attrition, minus the flow of particles discharged in the combustion fumes or in the effluents of the air reactor. This allows then to prevent the accumulation of ashes and of fine particles of oxygen-carrying material in the plant.

Another object of the present invention consists in complementing the device described above so as to provide an agglomerated ashes discharge system, by integrating an agglomerated ashes sedimentation system in the lower part of the first dense-phase fluidized-bed reaction zone. This device thus allows all of the agglomerated ashes that form in the reduction zone (fuel reactor) to be discharged. In this configuration, the agglomerated ashes are discharged from the reduction zone in a concentrated stream wherein the mass concentration of agglomerated ashes is at least 10%, preferably at least 50%.

DESCRIPTION OF THE FIGURES

The invention is illustrated by FIGS. 1, 2 and 3 by way of non limitative example.

Figure 1:
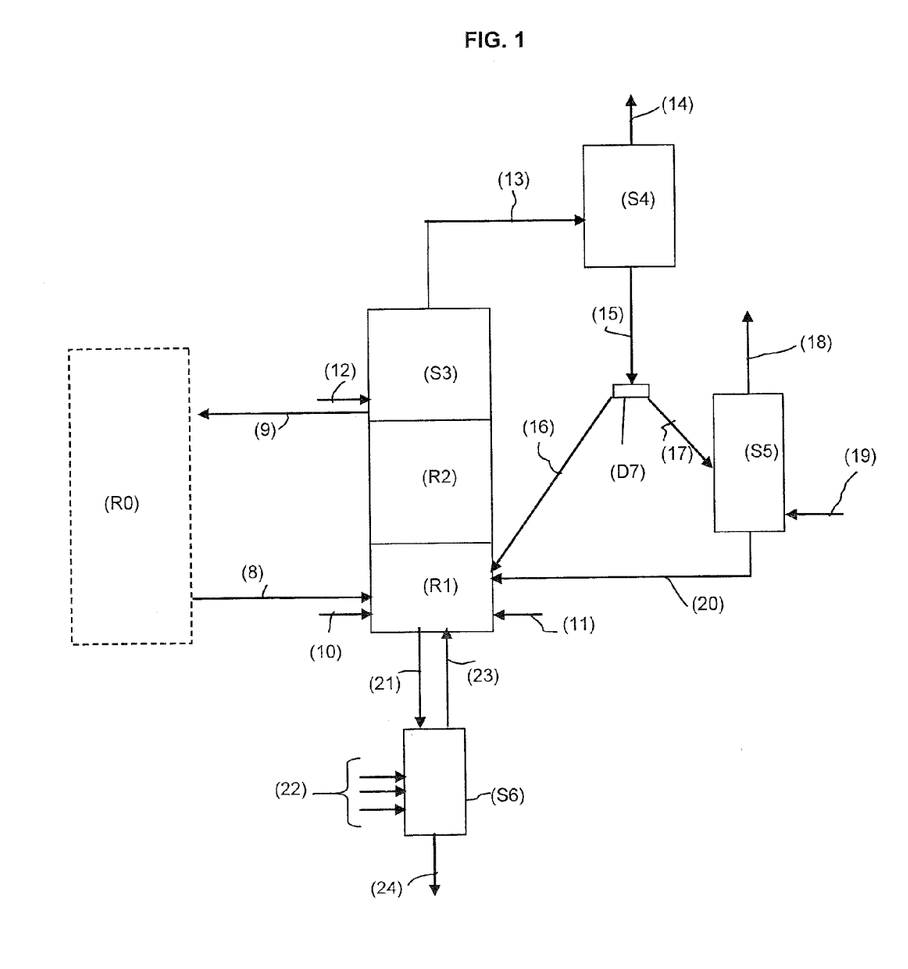
FIG. 1 describes the general principle of the invention comprising a reduction zone in the preferred embodiment thereof (with sedimentation of the agglomerated ashes).

FIG. 1

The reduction zone (fuel reactor) mainly consists of 3 zones:

a first zone R1 for contacting the solid feed particles in the presence of metallic oxide particles under dense fluidized bed conditions, a combustion zone (or second reaction zone) R2 for combustion of the gaseous effluents from the first reaction zone in the presence of the metallic oxide and solid fuel particles from zone R1, preferably under dilute fluidized bed conditions, a fast separation zone S3 for separation within a mixture from combustion zone R2, allowing separation of the gas, the unburnt solid fuel particles and the metallic oxide particles.

The plant furthermore comprises a fumes dedusting zone S4, an elutriation separation zone S5, an agglomerated ash sedimentation zone S6 and a stream division zone D7.

By way of simplification, the oxidation zone of the chemical loop is diagrammatically represented by the zone in dotted line (R0) in FIG. 1.

The oxygen-carrying material from oxidation zone R0 (not shown here) is preferably fed into dense fluidized bed contacting zone R1 of the reduction reactor through a line (8). The heavier particles leaving fast separation zone S3 through a line (9) are fed into oxidation zone R0 (air reactor). The solid fuel is fed into contacting zone R1 through one or more fuel supply lines (10). Contacting zone R1 is fluidized by means of a fluidization gas supply (11), generally an oxidizing gas such as water vapour or $CO_2$, introduced alone or in admixture.

In this first dense phase fluidized zone R1, the solid fuel exposed to temperature in the presence of an oxidizing gas undergoes devolatilization of the volatiles and partial gasification. Chemical-looping combustion of the gases formed starts in this zone. The residence time of the particles in this first zone generally ranges between 0.25 and 20 minutes, preferably between 2 and 10 minutes. The superficial gas velocity generally ranges between 0.3 and 3 m/s under the reaction conditions at the outlet of first reaction zone R1.

In this zone, the metallic oxide concentration is at least 10 vol. % and the temperature generally ranges between 800° C. and 1000° C., and it is preferably above 900° C.

The devolatilization, gasification and combustion gases carry the particles to second reaction zone R2, preferably under dilute fluidized transportation conditions, wherein the combustion reactions of the residual devolatilization and gasification gases are essentially conducted. In this zone, the average residence time for the gases generally ranges between 1 and 20 seconds, the average residence time for the solids ranging between 2 seconds and 1 minute. The velocity of the gas in this zone preferably ranges between 3 and 30 m/s, more preferably between 5 and 15 m/s, and the oxygen-carrying solid stream ranges between 25 and 500 kg/s/m$^2$, preferably between 60 and 300 kg/s/m$^2$ so as to promote good contacting between the gases and the metallic oxide particles. Under such conditions, a particle volume concentration below 10%, preferably below 5%, is sought.

The gas-particles mixture from second reaction zone R2 is then fed into separation zone S3 wherein fast separation of the heavier particles (mainly the oxygen-carrying material particles) from the lighter particles is carried out. The heavier particles leave separation zone S3 through discharge line (9) and they are discharged towards oxidation reaction zone R0 (air reactor). In order to promote separation of the dense particles from the light particles in separation zone S3, an external additional gas supply line (12) can be provided in enclosure S3 for fluidizing the dense particles in the lower part of the enclosure around the discharge line of second reaction zone R2.

The lighter particles essentially consisting of the unburnt fuel particles, the fly ashes and the lighter oxygen-carrying material particles are entrained with the combustion gases essentially containing $CO_2$ and water vapour, and they leave the fuel reactor through a discharge line (13). Preferably, the superficial gas velocity in the dilute phase of zone S3, resulting from the flow of combustion fumes and the optional addition of an external gas, corresponds to a value ranging between 30 and 300% of the average terminal rate of fall of the oxygen-carrying particles, preferably between 50 and 150% of the average terminal rate of fall of the oxygen-carrying particles.

Line (9) allows to discharge the denser particles of the medium, i.e. the major part of the metallic oxide particles, reduced after contact with the coal in zones R1 and R2, to the oxidation reactor (air reactor, diagrammatically represented by the zone in dotted line (R0)), as well as small amounts of fly ashes and the unburnt fuel that may not have been separated in zone S3.

The light particles leaving the reduction zone with the combustion gases through discharge line (13) are then sent to a dedusting zone S4 consisting of one or two separation stages. Separation is performed for example in cyclones, which are technological elements known to the person skilled in the art. This dedusting allows to recover at least 99% of the particles entrained in the combustion fumes at the fuel reactor outlet, preferably at least 99.5% of the particles. The dedusted gases leave dedusting zone S4 through a discharge line (14) and they are sent to optional post-treatments downstream from the reaction zone, such as: heat recovery zones allowing to decrease the temperature of the fumes to around the dew point thereof while producing vapour through thermal exchange, a pollutant (SOx, NOx, etc.) removal zone, an ultimate dedusting zone allowing to lower the particle content of the fumes to a sufficient concentration enabling $CO_2$ compression, a water vapour condensation zone and a compression zone for the fumes predominantly containing $CO_2$ after condensation of the combustion water.

The particles separated from the fumes are discharged from the combustion zone through a discharge line (15) and at least the particles coming from the first separation stage, in case of several separation stages, are sent to a stream division zone D7 consisting for example of a fluidized bed provided with a particle supply line (15) and with two particle discharge lines preferably positioned in the dense phase of the fluidized bed (16) and (17), or with any other means known to the person skilled in the art, such as a double siphon for example. These two streams (16) and (17) contain similar particle compositions.

Particle stream (16) is preferably the major part thereof, i.e. at least 50%, preferably at least 80% of the particle stream carried in line (13), and it is directly recycled to first reaction zone R1.

Particle stream (17) is preferably a minor part of the initial stream, and it is sent to an elutriation separation zone S5 consisting for example of a fluidized bed from which the lighter particles flow out through a discharge line (18), carried along with the fluidization gas that is fed through a supply line (19). The dense particles, i.e. the big unburnt coal particles and the major part of the oxygen-carrying material particles, remain in the dense phase of the fluidized bed and they are thereafter recycled to first reaction zone R1 through line (20). In the fluidized bed making up elutriation separation zone S5, the velocity is adjusted so as to allow elimination of a flow of fly ashes corresponding to the flow of ashes generated by the combustion by entrainment. The diameter of enclosure S5 allowing the ashes to be eliminated is adjusted according to the planned amount of ashes. Indeed, the particle entrainment from a fluidized bed depends on the entrainable particle concentration in the fluidized bed and on the empty bed section of the elutriator. The gas velocity is also adjusted according to separation requirements. The gas velocity also has an influence on the amount of entrainable material, but it affects the properties of the entrained materials. The higher the velocity, the more heavier particles can be entrained. Generally, the gas velocity ranges between 0.3 and 1.5 m/s, preferably between 0.4 and 1 m/s, so as to reach entrained particle flows ranging between 0.01 and 5 kg/s/m$^2$, preferably between 0.05 and 0.5 kg/s/m$^2$. The higher the velocity, the lower the ash concentration in residual stream (20) recycled to the fuel reactor.

Elutriation separation zone S5 is fluidized with a gas carefully selected according to the process requirements. Elutriation can be carried out with a carrier gas consisting of air. Under such conditions, the fluidization gas reoxidizes at least partly the oxygen-carrying material particles and the unburnt solid fuel particles. It is then possible, under such conditions, to have means allowing heat to be extracted in this zone for cooling the fluidized bed and/or its gaseous effluents. Under such conditions, fumes (18) from the elutriation separation zone are not mixed with the fumes of the reduction reactor coming from discharge line (14), but they can be mixed with the gaseous effluents of the air reactor for example or they can be treated separately.

It is also possible to use a gas such as $CO_2$ for elutriation separation in the fluidized bed. Under such conditions, the elutriator effluents leaving through line (18) can be mixed with the fumes from the fuel reactor leaving through discharge line (14), after post-treatment allowing the coal particles to be removed, such as a coal particles combustion zone for example.

Other gases such as water vapour can also be considered for elutriation separation.

Preferably, the flow of particles between stream divider D7 and first reaction zone R1, between divider D7 and elutriator separator S5, and between elutriator separator S5 and zone R1 of the reduction reactor is controlled by means of non-mechanical valves such as L-shaped valves.

Elutriation separation zone S5 allows elimination of the fine ash particles. Elutriation separation also allows elimination of the fine metallic oxide particles generated by attrition in the process. Selection of a high elutriation rate thus allows to eliminate the oxygen-carrying metallic oxide particles deteriorated by the circulation of particles between the air reactor (oxidation zone) and the fuel reactor (reduction zone).

In a preferred embodiment, a fluidized zone S6 allowing sedimentation of the furnace ashes, of very large size in relation to the oxygen-carrying material and solid fuel particles, is arranged beneath contacting zone R1 so as to enable the ashes to be discharged from the furnace. This zone is supplied with a mixture of particles essentially containing agglomerated ashes and metallic oxide, as well as small amounts of fly ashes and fuel through line (21). Separation zone S6 is fluidized at a low fluidization rate, corresponding to 1 to 10 times the minimum rate of fluidization of the oxygen-carrying material particles by a preferably oxidizing gas such as $H_2O$ or $CO_2$, alone or in admixture, supplied through one or more lines (22). The denser agglomerated particles tend to settle in the bottom of zone S6, while the lighter particles (non-agglomerated oxygen carrier, fly ashes and unburnt coal) are well fluidized and can be recycled to zone R1 by means of line (23).

At the base of zone S6, extraction means such as a cooled endless screw allow discharge of a particle stream (24) containing a mass concentration of at least 10% furnace ashes.

Figure 2:
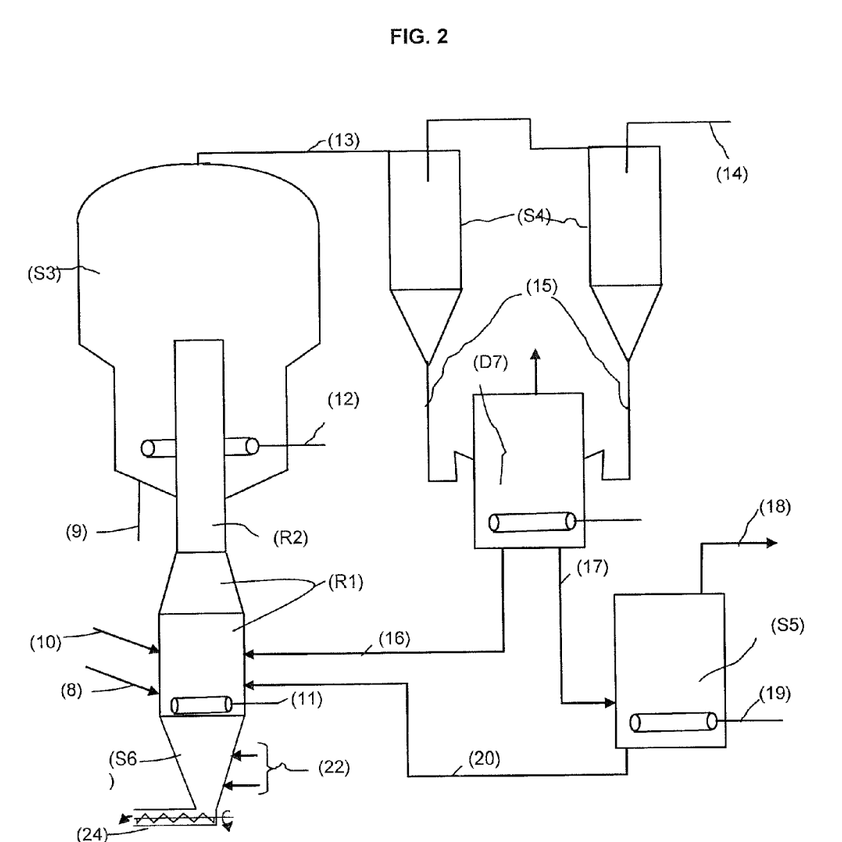
FIG. 2 describes a particular embodiment of reaction zones R1, R2 and of separation zone S3.

FIG. 2

FIG. 2 describes a particular embodiment of the reduction zone of the method according to the invention. For simplification reasons, the oxidation zone of the chemical loop is not shown in FIG. 2.

In FIG. 2, the three-zone (R1, R2, S3) reduction zone consists of a dense fluidized bed R1 topped by an acceleration cone opening into a transport tube R2 allowing dilute fluidized bed flow, transport tube R2 opening into separation zone S3 comprised of a large-diameter enclosure where the gas velocity is adjusted so as to allow separation of the oxygen-carrying particles mainly discharged at (9) from the lighter particles (unburnt fuel, fly ashes and fines of the oxygen-carrying material, discharged at (13) in the fumes line). The dedusting means in fumes line (13) consist of two stages of cyclones in series S4. The particles separated by these cyclones S4 are injected into a fluidized bed D7, operated at a fluidization rate close to the minimum fluidization rate so as to prevent any particle entrainment with the fluidization gas, and allowing to separate into two the separated particles stream by means of two lines (16) and (17) connected to the dense phase of fluidized bed D7. Stream (16) is recycled to the reduction reactor and stream (17) is sent to fluidized bed S5. In fluidized bed S5, the velocity imposed on the fluidization gas is high and it promotes entrainment of the lighter particles (fly ashes and possibly unburnt fuel and fines of the oxygen-carrying material) that flow out with the fluidization gas through line (18). The rest of the particles is recycled to the first contacting zone of reduction reactor R1.

In the part running on from the bottom of dense phase combustion zone R1, a truncated section S6 enables sedimentation of the agglomerated ashes that progressively migrate towards the bottom of truncated section S6. The fluidization rate imposed along truncated section S6 preferably ranges between 1 and 3 times the minimum rate of fluidization of the oxygen-carrying material particles to promote sedimentation of the agglomerated ashes, which are much bigger than the oxygen-carrying material. Under such conditions, the non-agglomerated oxide particles, the fly ashes and the fuel can come and go between zone S6 and zone R1. The cone half angle with respect to the vertical preferably ranges between 5° and 30°, preferably close to 15°. At the base of the cone, a cooled endless screw allows discharge of the agglomerated ashes in admixture with a fraction of oxygen-carrying material particles. The truncated section comprises staged vents running on from the bottom of the cone. At the base of the cone, at the first level, the flow injected through the vent corresponds for example to a flow rate generating 1 to 3 times the minimum rate of fluidization of the oxygen-carrying material at the second level further up in the cone. At the second level, the injected flow corresponds to the required venting complement generating 1 to 3 times the minimum rate of fluidization of the oxygen-carrying material at the third level further up in the cone, and so on until the base of the fuel reactor is reached. According to the height of the cone, the number of vents is adjusted so as to have injection ports approximately every meter. The gas injected is preferably $CO_2$ or water vapour.

The operation of the process described is favoured by the use of oxygen-carrying material whose grain size composition and grain density promote separation with the fly ash, unburnt fuel and agglomerated ash particles. The grain-size composition of the oxygen carrier is thus preferably such that 90 wt. % of the particles have a grain size ranging between 100 and 500 microns, more preferably 90% between 150 and 300 microns, and most preferably 95% between 150 and 300 microns.

Furthermore, the grain density of the oxygen carrier particles is preferably above 2500 kg/m$^3$, more preferably above 3400 kg/m$^3$, and most preferably above 4000 kg/m$^3$.

FIG. 3

FIG. 3 shows the grain size distribution of the fly ashes generated by the chemical-looping combustion of the coal according to the example hereafter.

EXAMPLE

The example below illustrates the invention using the simulation of the operation of a 3-MWth plant.

This plant is supplied with coal at a flow rate of 420 kg/h characterized by an ash content of 13.9 wt. % and a volatile content of 29.9%.

The coal is supplied in the fuel reactor with a grain size characterized by the fact that less than 2% of the coal has a particle size above 200 microns.

The grain size composition of the oxygen-carrying material is such that more than 90% of the grains ranges between 150 and 300 microns, and the density of the oxygen-carrying material is close to 4000 kg/m$^3$.

The grain size distribution of the fly ashes is given by way of example in FIG. 3.

The fuel reactor is made up of 3 zones:
  a first reaction zone R1 for contacting solid feed particles in the presence of metallic oxide particles under dense fluidized bed conditions;
  a dilute phase combustion zone (second reaction zone R2) for the gaseous effluents from the first reaction zone in the presence of metallic oxide particles;
  a particle separation zone S3 within a mixture coming from the dilute phase combustion zone, allowing the major part of the unburnt particles to be recovered with the fumes.

Combustion is conducted in the fuel reactor through contact with a metallic oxide transferring 1.9 wt. % oxygen, with a flow rate from the air reactor estimated at about 35,500 kg/h.

Stream (13) entrained at the outlet of fast separation zone S3 is made up of fine metallic oxide particles, fly ashes and unburnt coal particles. The composition of this stream is as follows:
  metallic oxide: 6000 kg/h
  ashes: 340 kg/h
  unburnt coal: 100.5 kg/h.

After dedusting, the separated particles flowing out through line (15) and carried towards dividing fluidized bed D7 have the composition as follows:
  metallic oxide: 5990 kg/h
  ashes: 333 kg/h
  unburnt coal: 100 kg/h.

Fluidized bed D7 separates stream (15) into two streams (16) and (17) of identical composition containing 85% and 15% of stream (15) respectively. Fluidized bed D7 is a 60 cm-diameter fluidized bed operated at a fluidization rate of 8 cm/s. The composition of stream (22) supplying the elutriator fluidized bed is as follows:
  metallic oxide: 899 kg/h
  ashes: 50 kg/h
  unburnt coal: 15 kg/h.

The composition of stream (16) sent back to the fuel reactor is as follows:

metallic oxide: 5091 kg/h
ashes: 283 kg/h
unburnt coal: 85 kg/h.

The elutriator allows approximately 80% of the ashes to be removed from stream (17). The elutriator is here a 0.8 m-diameter fluidized bed operated at a fluidization rate of 0.75 m/s. The elutriator is here fluidized by $CO_2$, through a line (19). The composition of the stream carried to the elutriator through line (18) is as follows:
metallic oxide: 29 kg/h
ashes: 40 kg/h
unburnt coal: 12 kg/h.

The composition of the stream leaving through line (20) allowing the particles that have not been carried to the elutriator to be recycled to the fuel reactor is as follows:
metallic oxide: 870 kg/h
ashes: 10 kg/h
unburnt coal: 3 kg/h.

The bottom of contacting zone R1 of the fuel reactor, 917 mm in diameter, is extended in the lower part thereof (underneath) by a cone of half-angle 15° to the vertical and 1711 mm in height in which 2 venting levels are arranged, one at the base of the cone allowing 7 kg/h vapour to be delivered, the other halfway up allowing 20 kg/h vapour to be delivered. Under such conditions, the average fluidization rate of the metallic oxide is close to 2 to 3 times the minimum rate of fluidization of metallic oxides and it allows to withdraw approximately 9 kg/h agglomerated ashes of mean diameter ranging between 0.5 and 5 mm at the base of the cone through extraction means (24) comprising a cooled extraction screw, in admixture with 30 kg/h metallic oxide.

Stream (9) carrying the particles that have not been separated in S3 to air reactor R0 has the following composition:
metallic oxide: 35,441 kg/h
ashes: 2 kg/h
unburnt coal: 8 kg/h.

The ashes and the coal sent to the air reactor are eliminated during reoxidation of the metallic oxide. The coal burns in the air reactor on contact with air and the ashes are eliminated by passing through a cyclone. The makeup metallic oxide intended to compensate for the oxide losses during elutriation is fed into the air reactor intermittently.

The above example clearly illustrates the operation of a chemical-looping coal combustion method allowing continuous ashes removal.

Thus, combustion of the coal generates an ashes flow rate of 58 kg/h. They are removed from the process in the following flows:
fly ashes carried to the air reactor (oxidation zone R0) by stream (9) after sedimentation in admixture with the oxygen-carrying material in fast separation zone S3=2 kg/h,
agglomerated furnace ashes extracted by means of extraction screw (24)=9 kg/h,
fly ashes entrained downstream from cyclones S4 with the fuel reactor fumes in stream (14)=7 kg/h,
fly ashes entrained in the gaseous effluents leaving elutriator S5 through line (18)=40 kg/h.

This continuous removal allows the ash accumulation in the plant to remain limited (ash circulation in the fuel reactor 350 kg/h in relation to an oxide circulation of 35,500 kg/h, i.e. a concentration of approximately 1%).

Furthermore, the coal burns essentially in the fuel reactor on contact with the metallic oxide, which allows capture rates above 90% to be considered. Indeed, 420 kg/h coal are fed into the fuel reactor.

The unburnt coal carried to air reactor R0 through line (9) represents a flow rate of 8 kg/h.

The unburnt coal carried to elutriator S5 through line (18) represents a flow rate of 12 kg/h.

The unburnt coal carried at the outlet of fumes dedusting zone S4 through line (14) represents a flow rate of 0.5 kg/h.

The invention claimed is:

1. A method for chemical-looping combustion of a hydrocarbon-containing feed of solid particles in which an oxygen-carrying material in form of particles circulates, said method comprising at least:
contacting of the hydrocarbon-containing solid feed particles with the oxygen-carrying material particles in a first reaction zone R1 operating under dense fluidized bed conditions to produce gaseous effluents carrying the oxygen-carrying material particles,
combustion of the gaseous effluents from the first reaction zone R1 in the presence of the oxygen-carrying material particles in a second reaction zone R2,
separation of unburnt solid feed particles, of fly ashes and of the oxygen-carrying material particles within a mixture coming from the second zone R2 in a fast separation zone S3 yielding a first stream comprising combustion fumes that contain a major part of the unburnt solid feed particles and the fly ashes, and a second stream comprising a major part of the oxygen-carrying material particles, the second stream being sent to an oxidation zone R0,
dedusting of the combustion fumes from the fast separation zone S3 in a fumes dedusting zone S4 so as to discharge a dedusted gas stream and a stream of particles containing fly ashes and dense particles predominantly comprising oxygen-carrying material particles and unburnt solid feed particles,
division of the stream of particles separated in dedusting stage S4 into two streams in a stream division zone D7, one stream being recycled to first reaction zone R1 operating under dense fluidized bed conditions, the other stream being sent to an elutriation separation zone S5,
elutriation separation of the fly ashes from the dense particles in said elutriation separation zone S5 so as to recover the fly ashes and to recycle the dense particles to the first reaction zone R1.

2. A method as claimed in claim 1, comprising:
sedimentation of furnace ashes agglomerated in the bottom of first reaction zone R1 in a fluidization zone S6 located beneath first reaction zone R1,
extraction of a particle stream comprising at least 10 mass % of agglomerated furnace ashes.

3. A method as claimed in claim 2, wherein zone S6 is fluidized by a gas with a fluidization gas rate in the largest cross-section of flow of the zone S6 that does not exceed 3 times the minimum rate of fluidization of the oxygen-carrying material.

4. A method as claimed in claim 3, wherein extraction of the agglomerated ashes in fluidization zone S6 is performed using a cooled screw.

5. A method as claimed in claim 1, wherein the solid feed is selected from among coal, coke, pet coke, biomass, bituminous sands and domestic waste.

6. A method as claimed in claim 1, wherein the oxygen-carrying material is a pulverulent solid whose particle size is such that 90% of the grain size distribution ranges between 150 and 300 microns.

7. A method as claimed in claim 1, wherein said one stream recycled to the first dense fluidized-bed reaction zone R1 represents at least 50% of the stream of particles separated in the dedusting zone S4 flowing into the stream division zone D7.

8. A method as claimed in claim 7, wherein said one stream recycled to first dense fluidized-bed reaction zone R1 represents at least 80% of the stream division zone D7.

9. A method as claimed in claim 1, wherein the fly ash concentration in the mixture circulating in the combustion zone of the second reaction zone R2 is below 5 wt. %.

10. A method as claimed in claim 9, wherein the fly ash concentration in the mixture circulating in the combustion zone of the second reaction zone R2 is below 1 wt. %.

11. A plant for carrying out chemical-looping redox combustion of a solid hydrocarbon feed according to the method as claimed in claim 1, said plant comprising at least:
- a first reaction zone R1 comprising a solid feed supply line, a fluidization gas supply line and a supply line for the oxygen-carrying particles from oxidation zone R0,
- a second reaction zone R2 receiving a gaseous effluent containing particles from the first reaction zone R1,
- a fast solid particle separation zone S3 receiving combustion fumes from the second reaction zone R2 containing fly ashes, oxygen-carrying material particles and unburnt solid feed particles, and comprising a discharge line for discharging a major part of the oxygen-carrying material particles to the oxidation zone R0,
- a fumes dedusting zone S4 receiving through an inlet lighter particles entrained by the combustion fumes from the fast separation zone S3,
- a stream division zone D7 receiving through an inlet a stream of particles separated from the fumes the fumes dedusting zone S4, said stream of particles separated from the fumes dedusting zone S4 comprising fly ashes and dense particles predominantly made up of oxygen-carrying material particles and unburnt solid feed particles,
- an elutriation separation zone S5 receiving through an inlet a minor part of the particle stream divided in stream division zone D7, comprising a supply line allowing a supply of a fluidization gas and a discharge line allowing discharge of lighter particles comprising fly ashes and oxygen-carrying material fines,
- a line coming from the stream division zone D7 for recycling directly a major part of the particle stream divided in the stream division zone D7 to the first reaction zone R1,
- a line coming from the elutriation separation zone S5 for recycling dense particles separated by the elutriation separation zone S5 to the first reaction zone R1.

12. A plant as claimed in claim 11, wherein the cross-section of flow of second reaction zone R2 is smaller than the cross-section of flow of the first reaction zone R1.

13. A plant as claimed in claim 11, comprising a sedimentation zone for the agglomerated furnace ashes arranged beneath first reaction zone R1 and comprising:
- an agglomerated ashes supply line,
- a fluidization zone S6,
- one or more lines allowing a fluidization gas to be fed,
- a discharge line for recycling the oxygen-carrying material particles to the first reaction zone R1,
- a line for extraction of a particle stream containing at least 10 mass % of agglomerated furnace ashes.

14. A plant as claimed in claim 13, wherein fluidization zone S6 is a truncated zone with a half angle with respect to the vertical less than or equal to 15°.

* * * * *